United States Patent
Shimizu et al.

(10) Patent No.: US 9,189,173 B2
(45) Date of Patent: Nov. 17, 2015

(54) MEMORY SYSTEM

(71) Applicant: Kabushiki Kaisha Toshiba, Minato-ku (JP)

(72) Inventors: Akira Shimizu, Toshima-ku (JP); Yoshihisa Kojima, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 95 days.

(21) Appl. No.: 14/169,346

(22) Filed: Jan. 31, 2014

(65) Prior Publication Data

US 2015/0067236 A1    Mar. 5, 2015

Related U.S. Application Data

(60) Provisional application No. 61/872,080, filed on Aug. 30, 2013.

(51) Int. Cl.
  *G06F 12/00* (2006.01)
  *G06F 3/06* (2006.01)

(52) U.S. Cl.
  CPC ............ *G06F 3/0659* (2013.01); *G06F 3/0604* (2013.01); *G06F 3/0679* (2013.01)

(58) Field of Classification Search
  None
  See application file for complete search history.

(56) References Cited

U.S. PATENT DOCUMENTS

| 8,015,360 B2 | 9/2011 | Hong et al. |
| 8,225,047 B2 | 7/2012 | Yano et al. |
| 2011/0161554 A1 | 6/2011 | Selinger et al. |

FOREIGN PATENT DOCUMENTS

| JP | 2009-15856 | 1/2009 |
| JP | 2009-211217 | 9/2009 |

*Primary Examiner* — Brian Peugh
(74) *Attorney, Agent, or Firm* — Oblon, McClelland, Maier & Neustadt, L.L.P.

(57) ABSTRACT

According to one embodiment, the memory controller outputs a first command, then outputs N pieces of second commands to first and second memory chips, and reads out the read data from the first and second memory chips. First time is for reading out the read data from a memory cell array to a buffer, and second time is for transferring data of the one-Nth of the read data from the buffer to the memory controller. The memory controller outputs the first command, then outputs M pieces of the second commands to the first memory, then outputs a first command to the second memory chip, and then outputs (N−M) pieces of the second commands to the first memory chip. A relationship of (N−M−1)×(second time) <first time<=(N−M)×(second time) is satisfied.

10 Claims, 4 Drawing Sheets

TIME

MEMORY SYSTEM

CROSS-REFERENCE TO RELATED APPLICATIONS

This application is based upon and claims the benefit of priority from U.S. Provisional Patent Application No. 61/872,080, filed on Aug. 30, 2013; the entire contents of which are incorporated herein by reference.

FIELD

Embodiments described herein relate generally to a memory system.

BACKGROUND

As a memory system used in a computer system and the like, a SSD (Solid State Drive) that installs memory chips having NAND type memory cell arrays is being focused. The SSD in some cases is configured by a plurality of memory chips being connected to a same channel.

DETAILED DESCRIPTION

In general, according to one embodiment, a memory system is provided with first and second memory chips, and a memory controller. Each of the first and second memory chips reads out read data to the buffer from the memory cell array when a first command is received, and orderly outputs one-Nth of the read data that was read out in the buffer when a second command is received. The memory controller is connected to the first and second memory chips via wirings through which the read data outputted from the first and second memory chips is transferred. The memory controller outputs the first command, then outputs N pieces of second commands to the first and second memory chips, and reads out the read data from the first and second memory chips. First time is required for reading out the read data from the memory cell array to the buffer, and second time is required for transferring data of the one-Nth of the read data from the buffer to the memory controller. In a case where the memory controller reads out first read data from the first memory chip, and then reads out second read data from the second memory chip, the memory controller outputs the first command, then outputs M pieces of the second commands to the first memory, then outputs a first command to the second memory chip, and then outputs (N−M) pieces of the second commands to the first memory chip. A relationship of (N−M−1)×(second time)<first time<=(N−M)×(second time) is satisfied.

Exemplary embodiments of the memory system will be explained below in detail with reference to the accompanying drawings. The present invention is not limited to the following embodiments.

Although a case in which the memory system of an embodiment of the invention is adapted to an SSD will be described, the memory system of the embodiment of the invention can be adapted to memory systems other than the SSD.

Figure 1:
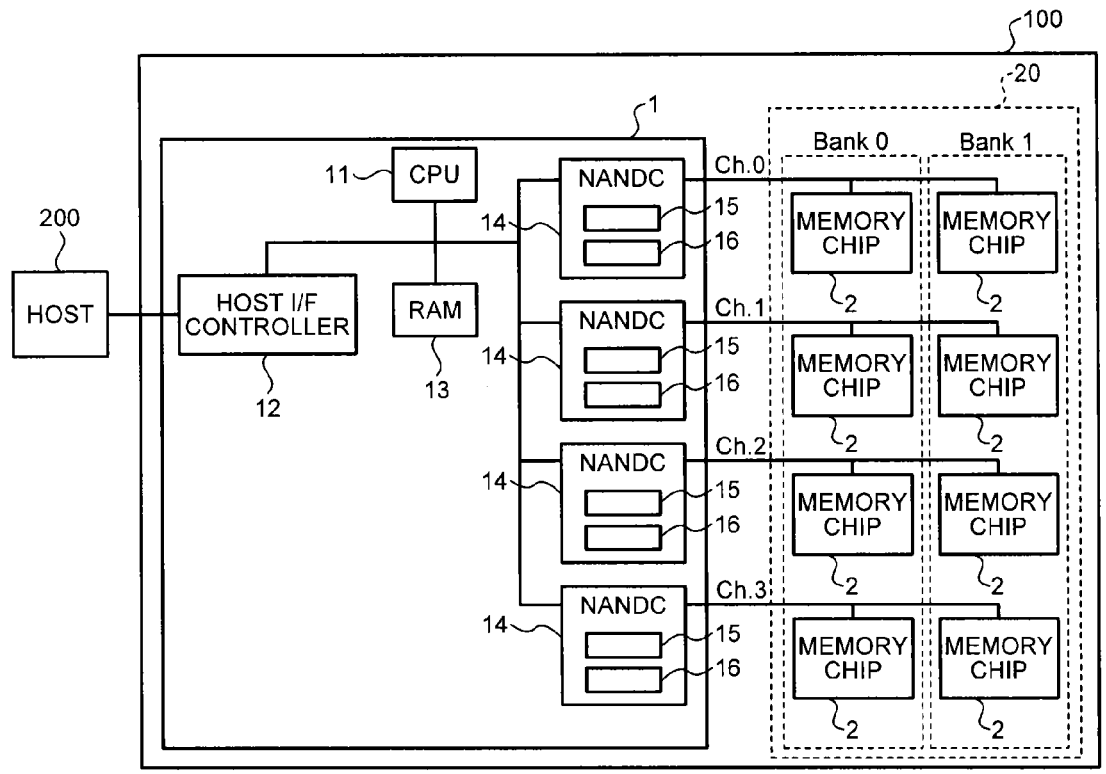
FIG. 1 is a diagram illustrating a configuration example of an SSD of a first embodiment of the invention.

FIG. 1 is a diagram illustrating a configuration example of an SSD of a first embodiment of the invention. As illustrated, an SSD 100 is connected to a host 200 by a predetermined communication interface. The host 200 is for example a personal computer, or a portable type information processing device and the like. The SSD 100 functions as an external storage device of the host 200. The SSD 100 can receive an access request (read request and write request) from the host 200. The access request from the host 200 includes a logical address indicating a position to be accessed.

The SSD 100 includes a controller 1 and eight pieces of memory chips 2. Each of the memory chips 2 is herein NAND type flash memory. The eight pieces of memory chips 2 may collectively be termed NAND memory 20. Notably, the type of the memory chips 2 is not limited only to the NAND type flash memory. For example, NOR type flash memory may be adapted.

The controller 1 includes four channels (Ch.0 to Ch.3). Each of the channels is connected respectively to two memory chips 2. Each of the channels is configured by including a control signal line, an I/O signal line, a CE (Chip Enable) signal line, and a RY/BY signal line. The I/O signal line is a signal line for sending and receiving data, addresses, and commands. The control signal line is a collective term for a WE (Write Enable) signal line, an RE (Read Enable) signal line, a CLE (Command Latch Enable) signal line, an ALE (Address Latch Enable) signal line, a WP (Write Protect) signal line, and the like. The controller 1 can independently control the memory chips 2 for each channel by utilizing the fact that the signal lines of the four channels are independent of one another.

The controller 1 includes a CPU 11, a host interface controller (host I/F controller) 12, RAM 13, and four NAND controllers (NANDCs) 14. The CPU 11, the host I/F controller 12, the RAM 13, and the four NANDCs 14 are connected to one another by a bus. The four NANDCs 14 are respectively connected to different channels.

The CPU 11 executes control of the entirety of the controller 1 based on a firmware program. The RAM 13 functions as a data transfer buffer between the host 200 and the memory chips 2, and as a work area memory. The firmware program is stored for example in the NAND memory 20. The firmware program is read out from the NAND memory 20 and expanded in the work area in the RAM 13 upon startup of the SSD 100. The CPU 11 executes the control of the controller 1 by executing the firmware program expanded in the work area.

As a part of the control of the controller 1, the CPU 11 executes translation between a logical address used for the access request from the host 200 and a physical address indicating a physical position within a memory cell array (memory cell array 21 to be described later) provided in the memory chips 2. A corresponding relationship between the logical address and the physical address is for example described in address translation information and stored in the work area. The CPU 11 updates the address translation information each time the corresponding relationship is changed.

The host I/F controller 12 executes control of a communication interface connecting between the host 200 and the SSD 100 and data transfer between the host 200 and the RAM 13 based on instructions from the CPU 11. The NANDCs 14 execute data transfer between the RAM 13 and the memory chips 2 based on instructions from the CPU 11.

Figure 2:
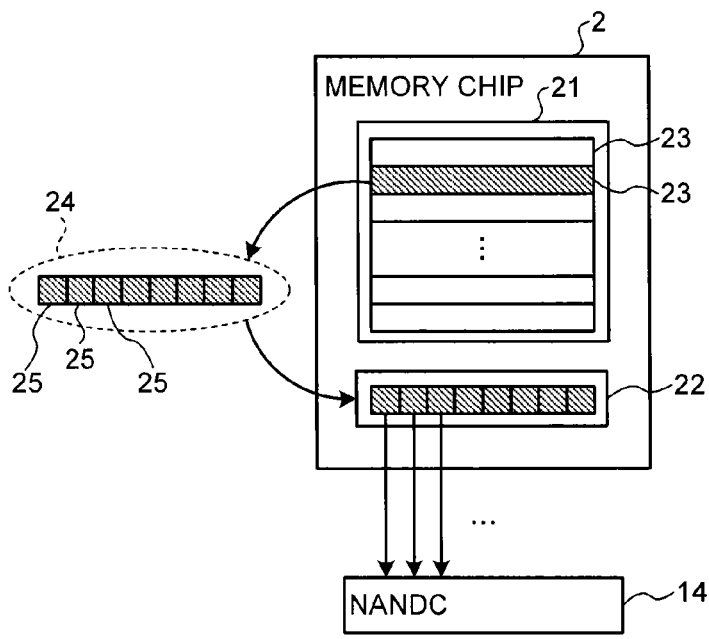
FIG. 2 is a diagram explaining a configuration of a memory chip.

FIG. 2 is a diagram explaining a configuration of the memory chips 2. Each memory chip 2 includes a NAND type memory cell array 21 that stores data sent from the host 200, and a register 22 for input and output of the data. The memory cell array 21 is non-volatile. The memory cell array 21 is configured by including a plurality of pages 23, each of which is a unit of write/read performed to the memory cell array 21. Data 24 stored in each page 23 is configured of data 25 called a cluster. A size of the cluster is smaller than a size of the page 23. In FIG. 2, the page 23 is equal to the size of eight pieces of clusters.

Upon a read process, the data 24 read out from the page 23 is temporarily stored in the register 22. Then, the data 24 read out in the register 22 is outputted to the NANDC 14 serially in units of the data 25, being in cluster units. Thereafter, a process by which the data 24 is read out from the memory cell array 21 to the register 22 will be expressed as a page read process. Further, a process by which the data 25 in the cluster units is read out from the register 22 to the NANDC 14 will be expressed as a cluster read process.

Figure 3:
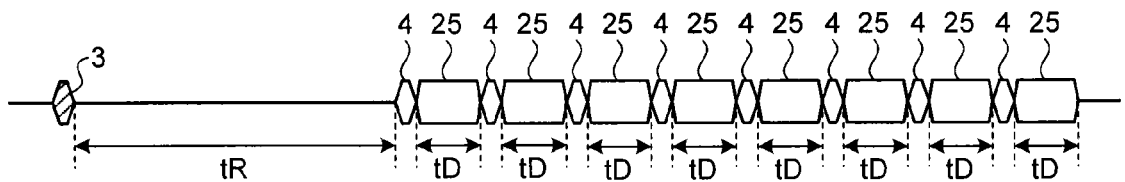
FIG. 3 is a diagram explaining an I/O signal that is sent and received between a NANDC and the memory chip during a read process.

FIG. 3 is a diagram explaining an I/O signal that is sent and received between the NANDC 14 and the memory chip 2 during the read process. Upon the read process, each NANDC 14 sends a page read command (first command) 3 to one memory chip 2. When the page read command 3 is received, the memory chip 2 executes the page read process. The page read process requires process time tR. After the page read process is completed, the NANDC 14 sends eight pieces of cluster read commands 4 orderly to the memory chip 2. Each time the cluster read command 4 is received, the memory chip 2 orderly outputs the data 25 configuring the data 24, which is read out to the register 22 by the page read process, to the NANDC 14 from a header-side in the cluster units. Each of the cluster read processes requires process time tD.

As illustrated in FIG. 1, each of the channels has two memory chips 2 connected thereto. One of the two memory chips 2 connected to each channel will be expressed as bank 0 (Bank 0), and the other as bank 1 (Bank 1). Each NANDC 14 includes a command queue 15 for the bank 0, and a command queue 16 for the bank 1. Commands sent from the CPU 11 are inputted to the command queues 15, 16. The commands to be inputted to the command queues 15, 16 include the page read command and the cluster read commands. The NANDC 14 extracts the command inputted to the command queues 15, 16, and sends the same to the bank 0 or the bank 1.

Notably, the two memory chips 2 connected to the same channel share the I/O signal line (wiring). Thus, in the NANDC 14, during when a command or data is sent and received with one of the banks, a command or data cannot be sent and received with the other of the banks. In a case where a command is stored in both of the command queues 15, 16, the NANDC 14 can determine from which of the command queues 15, 16 the command is to be extracted and sent based on a state of use of the I/O signal line and RY/BY signals from each bank.

Notably, since the page read process is a process inside the memory chip 2, it is a process that does not use the I/O signal line. Since the cluster read process is a process that outputs the data 25 to the NANDC 14, it is a process that uses the I/O signal line. Accordingly, it is possible to cause one of the banks to execute the page read process while causing the other of the banks to execute the cluster read process.

Further, to improve read performance, the CPU 11 executes a look-ahead process in the read process. The look-ahead process is a process that sends the cluster read commands to read one or more data 25 having sequential physical addresses with specific data 25 to the NANDC 14 during when reading of the specific data 25 from the memory chip 2 is performed. That is, by the look-ahead process, a state is assumed in which unprocessed cluster read commands are resident in the command queues 15, 16. A set value of a number (or data amount) of the unprocessed cluster read commands retained by the look-ahead process is expressed as a look-ahead length. Here, as an example, the look-ahead length is set at "1".

Further, in a case where timing to switch banks is about to arrive during the execution of the read process, the CPU 11 sends the page read command for a subsequent bank to the NANDC 14 at a timing that goes back in time by a time corresponding to tR from the aforementioned timing. The bank switch means switching a read destination from one bank to another bank upon reading the data 25 out sequentially from two banks. A page that is the target of the page read command sent at this occasion is a page 23 of which page address follows the physical address (page address) allotted to the previous page 23, which is currently being an access destination.

Figure 4:
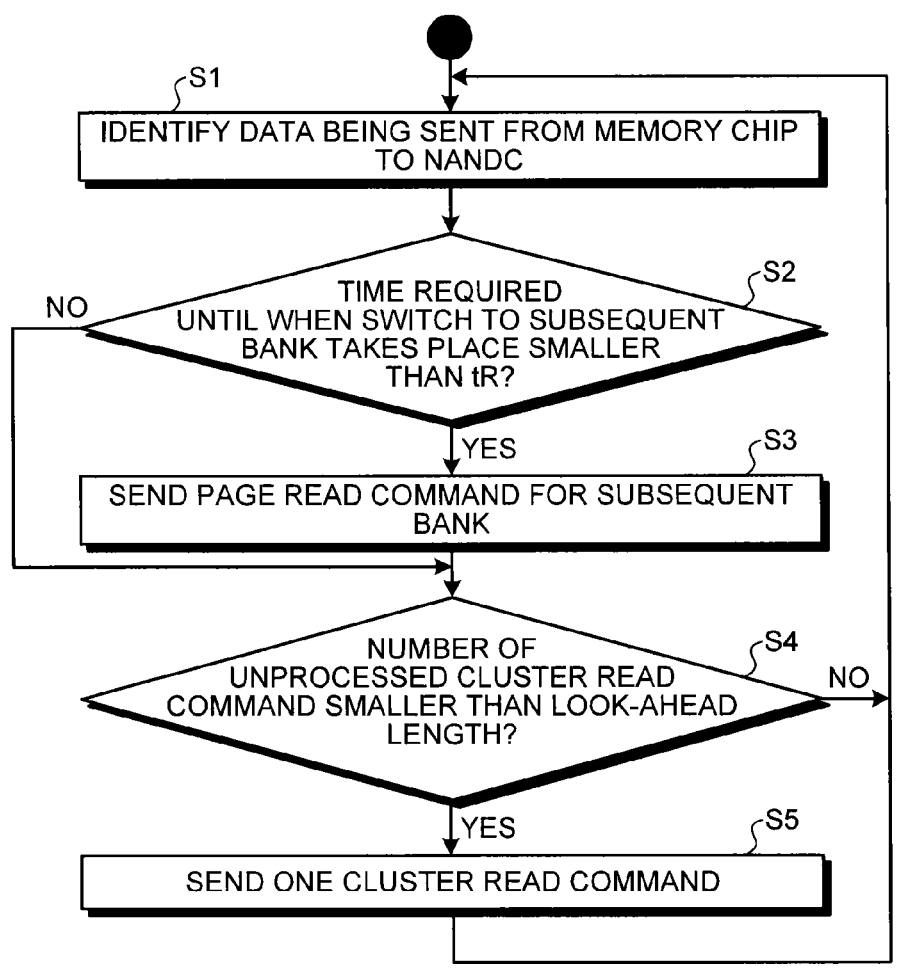
FIG. 4 is a flow chart explaining an operation of a CPU.

FIG. 4 is a flow chart explaining an operation of the CPU 11 upon the read process. Here, since the operation of the CPU 11 with respect to each of the four channels is identical, the operation will be described for one channel.

During when the read process is being executed, the CPU 11 identifies the data 25 that is being sent from the memory chips 2 to the NANDC 14 (S1). The CPU 11 can identify the data 25 being sent by inquiring the NANDC 14 as to which of commands have been executed among the cluster read commands that have already been sent, or by causing the NANDC 14 to report the same.

Next, the CPU 11 determines whether time required until when the switch to the subsequent bank takes place is smaller than tR or not (S2). The time required until when the switch to the subsequent bank takes place is calculated for example based on an amount of data that is scheduled to be sent after the data 25 that is currently being sent. For example, in a case where the bank switch needs to be performed after having sent three data 25 of a cluster unit, the time required until when the switch to the subsequent bank takes place is substantially equal to 3*tD.

In a case where the time required until when the switch to the subsequent bank takes place is smaller than tR (S2, Yes), the CPU 11 sends a page read command requesting a page read process for the subsequent bank to the NANDC 14 (S3). In a case where the time required until when the switch to the subsequent bank takes place is larger than tR (S2, No), the CPU 11 skips the process of step S3.

Next, the CPU 11 determines whether the number of the unprocessed cluster read commands in the command queues 15, 16 is smaller than the look-ahead length or not (S4). In a case where the number of the unprocessed cluster read commands is smaller than the look-ahead length (S4, Yes) the CPU 11 sends one new cluster read command for the look-ahead process to the NANDC 14 (S5).

In a case where the number of the unprocessed cluster read commands is larger than the look-ahead length (S4, No), or after the step S5, the CPU 11 executes the process of step S1 again.

In a case where a page read command for another bank is inputted in the command queue during the execution of the cluster read process of one bank, the NANDC 14 sends the page read command to the other bank after the execution of the cluster read process that is being executed is completed. Then, after having sent the page read command to the other bank, a cluster read command for a subsequent cluster read process as stored in the command queue for the one bank is sent to the one bank.

Figure 5:
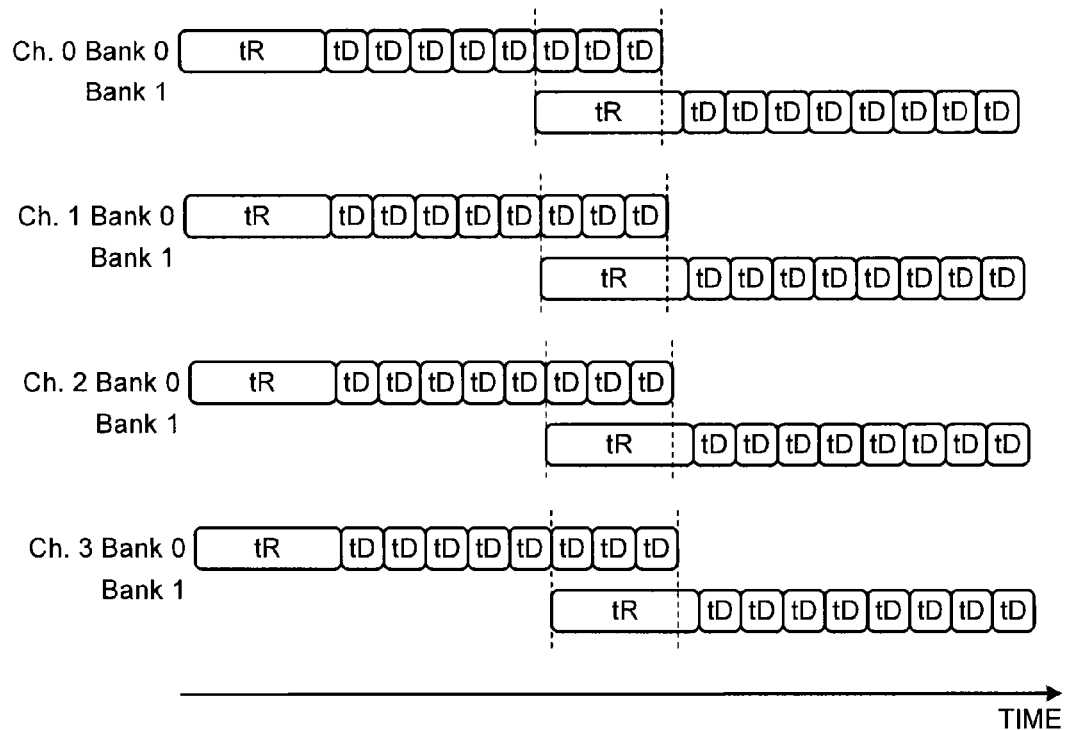
FIG. 5 is a diagram explaining an example of a start timing of a page read process.

FIG. 5 is a diagram explaining an example of a start timing of the page read process. In FIG. 5, timing chart of each bank is arranged in a vertical direction. A horizontal direction illustrates elapsed time. Notably, a transfer time of each command (page read command and cluster read command) is small compared to tR and tD, thus is omitted herein.

As illustrated in FIG. 5, for example, in Ch.0, the page read process in the memory chip 2 of the bank 1 is started at the time when the output of five pieces of data 25 from the memory chip 2 of the bank 0 is completed. Accordingly, upon the bank switch from the bank 0 to the bank 1, most of the process time taken for the page read process in the memory chip 2 of the bank 1 is hidden by the time to output three pieces of data 25 from the memory chip 2 of the bank 0. The same applies to Ch.1 to Ch.3.

Further, in a case where the page read process of the memory chip 2 of the bank 1 is started at an earlier timing than the start timing of the page read process illustrated in FIG. 5, for example, if the data request from the host 200 ceases, or if data 24 that is different from data 24 read out to the register 22 in the page read process is requested to be read by the host 200, a need arises to newly execute the page read process. According to the embodiment, the start timing of the page read process of the memory chip 2 of the bank 1 is at a timing late enough so that the process time required for the page read process can be hidden. Accordingly a probability of an occurrence of an unnecessary page read process is reduced.

Figure 6:
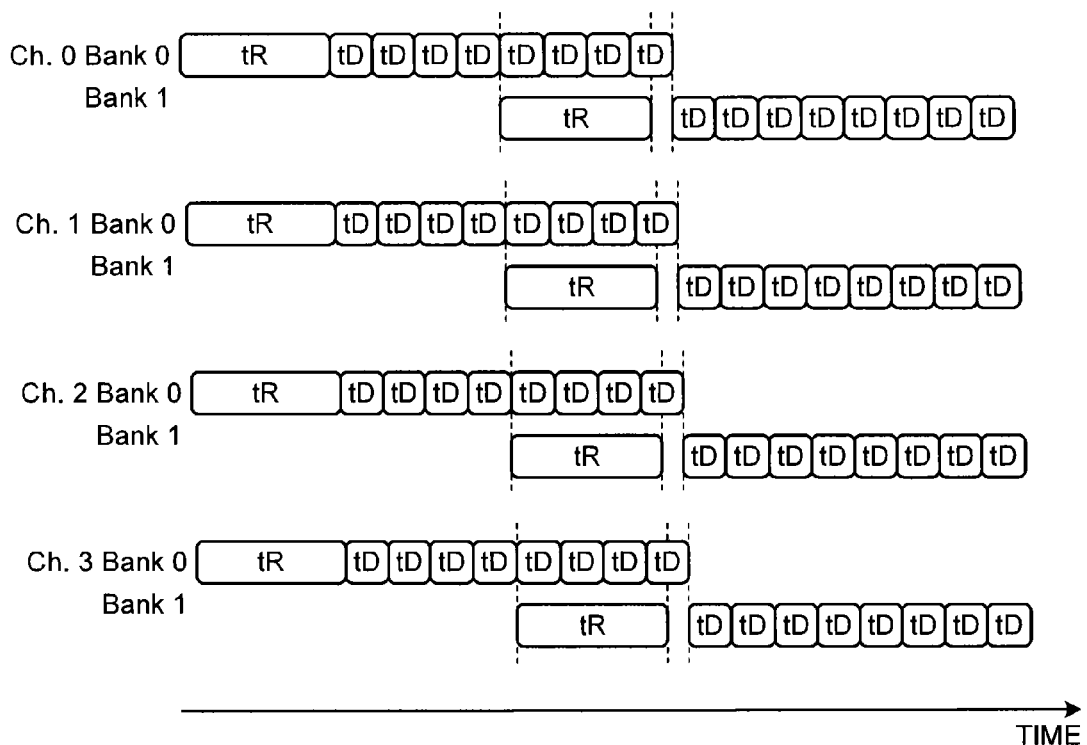
FIG. 6 is a diagram explaining an example of the start timing of the page read process.

FIG. 6 is a diagram explaining another example of the start timing of the page read process. According to FIG. 6, for example, in Ch.0, the page read process in the memory chip 2 of the bank 1 is started at the time when the output of four pieces of data 25 from the memory chip 2 of the bank 0 is completed. Further, the cluster read process of the memory chip 2 in the bank 1 is started after when all of the cluster read processes of the memory chip 2 in the bank 0 is completed. Accordingly, upon the bank switch from the bank 0 to the bank 1, an entirety of the process time required from the page read process in the memory chip 2 in the bank 1 is hidden by the time to output three pieces of data 25 from the memory chip 2 in the bank 0. The same applies to Ch.1 to Ch.3. In order to cause the page read process to be started for the memory chip 2 in the bank 1 at the timing explained in FIG. 6, the CPU 11 should compare the time required until when the switch to the subsequent bank takes place with a value that adds tR and tD in the process of step S2.

Thus, according to the embodiment of the invention, upon sequentially reading out data from two banks, the controller 1 causes the page read process to start on the memory chip 2 of another bank during when the cluster read process is being executed for the memory chip 2 of one bank, at a timing that goes back in time from the timing of the bank switch by a time corresponding to the process time tR required for the page read process. Accordingly, since the process time of the page read process upon the bank switch is hidden, the read performance is improved. Further, the probability of the occurrence of the unnecessary page read process is reduced.

Notably, since the I/O signal line is shared by the one bank and the other bank, the start timing of the page read process of the memory chip 2 of the other bank is equal to a timing of an interval of the cluster read process by the memory chip 2 of the one bank. Accordingly, in assuming that a size of the page 23 is equal to a size of N pieces of clusters, the timing to send the page read command to the memory chip 2 of the other bank becomes a timing after having sent M pieces of cluster read commands to the memory chip 2 of the one bank. Here, a relationship of (N−M−1)×tD<tR<=(N−M)×tD is satisfied.

Notably, in the above description, the NAND memory 20 is described as having two banks, however, the embodiment of the invention can be adapted to a memory system having three or more banks. For example, in a case where two memory chips belonging to different banks among the three or more banks are to be read sequentially, the page read process of the memory chip that is later-read between the two memory chips that are sequentially read is started at a timing that goes back in time by a time corresponding to tR from the bank switching timing.

Notably, the controller 1 may send commands in chronological order. For example, in a case where the time required until when the switch to the subsequent bank takes place becomes smaller than tR, the CPU 11 sends all of the cluster read commands scheduled to be executed before switching to the next bank to the NANDC 14, and thereafter sends the cluster read command to the NANDC 14. Notably, by the above, the number of the unprocessed cluster read commands temporarily increases. This is equivalent to the look-ahead length being temporarily changed to a large value (N) in the case where the time required until when the switch to the subsequent bank takes place becomes smaller than tR. The controller 1 normally sets the look-ahead length at a value that is larger than 1 and smaller than N, and changes the look-ahead length to N in the case where the time required until when the switch to the subsequent bank takes place becomes smaller than tR.

Notably, in the above description, the CPU 11 was described as being able to separately send the page read command and the cluster read command. The CPU 11 may be configured incapable of sending the page read command. In such a case, the CPU 11 sends the cluster read command for the memory chip 2 of the subsequent bank to the NANDC 14 instead of sending the page read command for the memory chip 2 of the subsequent bank to the NANDC 14. In a case where the cluster read command for the memory chip 2 of the subsequent bank is received, the NANDC 14 identifies that the page read process needs to be executed. Then, the NANDC 14 generates the page read command, and sends the generated page read command to the memory chip 2 of the subsequent bank.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
first and second memory chips, each of which includes a memory cell array and a buffer, each of the first and second memory chips reads out read data from the memory cell array to the buffer when a first command is received, and outputs one-Nth of the read data from the buffer when a second command is received; and a memory controller connected to the first and second memory chips via wirings through which the read data outputted from the first and second memory chips is transferred, the memory controller being configured to output the first command and thereafter outputs N pieces of second commands to the first and second memory chips, and to receive the read data from the first and second memory chips, first read-time being required to read out the read data from the memory cell array to the buffer, and second read-time being required to transfer each of the one-Nth of the read data from the buffer to the memory controller, wherein in a case where the memory controller reads out first read data from the first memory chip and thereafter reads out second read data from the second memory chip, the memory controller outputs the first command to the first memory chip, and then outputs M pieces of the second commands to the first memory chip, after which the memory controller outputs the first command to the second memory chip, and then outputs (N−M) pieces of the second commands to the first memory chip, a relation of (N−M−1)×(the second time)<the first time<= (N−M)×(the second time) being satisfied.

2. The memory system according to claim 1, wherein the memory controller includes,
a first command queue in which commands sent to the first memory chip are inputted,
a second command queue in which commands sent to the second memory chip are inputted,
a processor that inputs the first and second commands to the first and second command queues, and
a chip control unit that outputs the commands inputted to the first and second command queues to the wirings.

3. The memory system according to claim 2, wherein
the processor inputs the first command in the second command queue when time required until readout of the first read data is completed becomes smaller than the first time, and
the chip control unit outputs the first command stored in the second command queue just after the readout of one-Nth data that is being executed in a case where the first command is stored in the second command queue during the readout of the first read data.

4. The memory system according to claim 3, wherein
the processor successively inputs the second commands in the first command queue so that a number of the second commands stored in the first command queue becomes a constant value during the readout of the first read data.

5. The memory system according to claim 4, wherein
the processor inputs the first command in the second command queue and inputs rest of the second commands required for completing readout of the second read data in the first command queue when the time required until the readout of the first read data is completed becomes smaller than the first time.

6. A memory controller that controls first and second memory chips, each of which includes a memory cell array and a buffer, each of the first and second memory chips reads out read data from the memory cell array to the buffer when a first command is received, and outputs one-Nth of the read data from the buffer when a second command is received, wherein the memory controller is
connected to the first and second memory chips via wirings through which the read data outputted from the first and second memory chips is transferred, and
configured to output the first command and thereafter outputs N pieces of second commands to the first and second memory chips, and to receive the read data from the first and second memory chips, first read-time is required to read out the read data from the memory cell array to the buffer, and second read-time is required to transfer each of the one-Nth of the read data from the buffer to the memory controller, and in a case where the memory controller reads out first read data from the first memory chip and thereafter reads out second read data from the second memory chip, the memory controller outputs the first command to the first memory chip, and then outputs M pieces of the second commands to the first memory chip, after which the memory controller outputs the first command to the second memory chip, and then outputs (N−M) pieces of the second commands to the first memory chip, a relation of (N−M−1)×(the second time)<the first time<= (N−M)×(the second time) being satisfied.

7. The memory controller according to claim 6, further comprising:
a first command queue in which commands sent to the first memory chip are inputted;
a second command queue in which commands sent to the second memory chip are inputted;
a processor that inputs the first and second commands to the first and second command queues; and
a chip control unit that outputs the commands inputted to the first and second command queues to the wirings.

8. The memory controller according to claim 7, wherein
the processor inputs the first command in the second command queue when time required until readout of the first read data is completed becomes smaller than the first time, and
the chip control unit outputs the first command stored in the second command queue just after the readout of one-Nth data that is being executed in a case where the first command is stored in the second command queue during the readout of the first read data.

9. The memory controller according to claim 8, wherein
the processor successively inputs the second commands in the first command queue so that a number of the second commands stored in the first command queue becomes a constant value during the readout of the first read data.

10. The memory controller according to claim 9, wherein
the processor inputs the first command in the second command queue and inputs rest of the second commands required for completing readout of the second read data in the first command queue when the time required until the readout of the first read data is completed becomes smaller than the first time.

* * * * *